United States Patent [19]

Stone

[11] 4,022,422
[45] May 10, 1977

[54] STEMLESS BANTAM VALVE

[75] Inventor: Jack P. Stone, Annandale, Va.

[73] Assignee: The United States of America as represented by the Secretary of the Navy, Washington, D.C.

[22] Filed: Feb. 19, 1976

[21] Appl. No.: 659,295

[52] U.S. Cl. .............................. 251/118; 251/346; 251/351

[51] Int. Cl.² ........................................ F16K 47/00

[58] Field of Search .......... 251/341, 343, 344, 346, 251/347, 118, 351

[56] References Cited

UNITED STATES PATENTS

| 486,722 | 11/1892 | Loss | 251/344 |
|---|---|---|---|
| 1,423,418 | 7/1922 | Grikscheit | 251/346 |
| 2,332,114 | 10/1943 | Robb | 251/344 |
| 3,476,144 | 11/1969 | Krantz | 251/346 |

FOREIGN PATENTS OR APPLICATIONS

| 118,640 | 1/1943 | Australia | 251/344 |
|---|---|---|---|
| 221,638 | 5/1957 | Australia | 251/344 |
| 528,208 | 7/1956 | Canada | 251/344 |
| 1,097,717 | 7/1955 | France | 251/344 |
| 786,419 | 11/1957 | United Kingdom | 251/344 |

*Primary Examiner*—William R. Cline
*Assistant Examiner*—H. Jay Spiegel
*Attorney, Agent, or Firm*—R. S. Sciascia; Philip Schneider; Melvin L. Crane

[57] ABSTRACT

A small, light weight, stemless valve for accurately metering constant-volume rates of gas flow. The valve is provided with a filter which protects a small interchangeable orifice from particulate matter, and the housing parts are rotatable relative to each other for controlling gaseous flow through the valve and for preventing flow through the valve.

1 Claim, 1 Drawing Figure

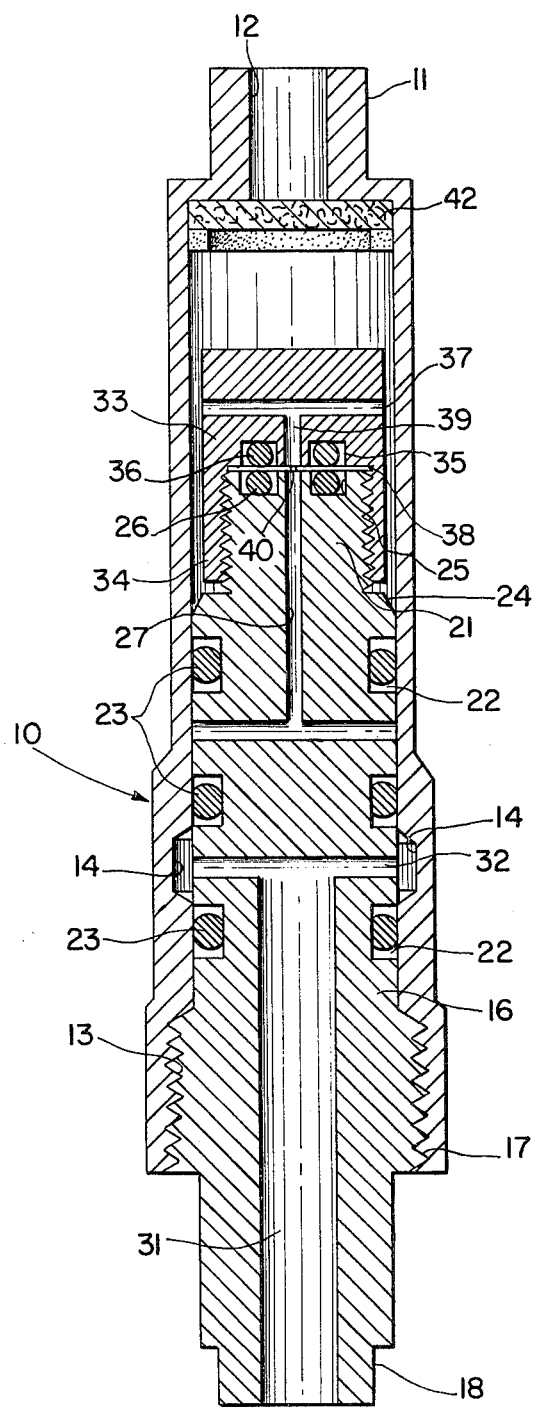

4,022,422

STEMLESS BANTAM VALVE

BACKGROUND OF THE INVENTION

This invention is directed to a small, light weight valve which controls gaseous flow without the aid of a valve stem.

Heretofore control valves have been made with valve stems which project from the body by which gas flow is controlled. Such an arrangement adds unnecessary weight and uses additional space for the valve. Further the valve has a T-shape which will require additional space. Additionally a valve of this arrangement is so constructed that "dead" areas are found around the valve stem, etc. so that there are areas which may not be purged, if necessary.

SUMMARY OF THE INVENTION

The valve of this invention is stemless with gas flow along the length of the body. The valve includes a flow control device, a filter and an on and off control within a single small size package without any protruding control devices.

BRIEF DESCRIPTION OF THE DRAWING

The drawing is a cross sectional view of the valve illustrating the relative parts.

DETAILED DESCRIPTION

Now referring to the drawing, there is shown by illustration a cross sectional view of a valve made in accordance with the teaching of this invention. As shown, the valve includes an outer elongated housing 10 having a larger diameter along the lower portion than that of the upper portion. The upper or inlet end 11 has a smaller diameter than the remainder of the body and may be used for the purpose of securing the valve into a system. This end may be threaded on the outside or not threaded as desired by the user. The inside diameter of the housing is uniform along the length of its upper end which is closed except for an axially aligned passage 12 through the smaller diameter end 11. The lower or output end of the housing is provided with threads 13 on the inside thereof with a chamfer from the upper most thread to the inner wall to provide a smooth transition without any burrs, etc. A short distance upwardly from the threaded end, the inner surface is provided with two opposing cutouts 14 whose edges in the axial direction are chamfered to avoid sharp edges. The inner surface of the housing and the outer surface of a valve body therein must have a smooth finish such that the roughness is no greater than 32 microinches.

The housing 10 receives therein a machined valve body 16 which is provided with a threaded portion 17 that mates with the threaded portion of the housing. The portion below the threads, the output end, is smaller in diameter than the threaded portion and is provided with a stepped down end 18 that may be threaded if desired for connection into a desired system. The major length of the valve body has substantially the same outer diameter as the inner diameter of the housing but with a loose fit so that gases can flow between the inner housing wall and that of the outer wall of the valve body. The upper or input end 21 of the valve body is of smaller diameter than the main body portion and is threaded on the outside. The main portion of the valve body is provided with three spaced grooves 22 about the diameter thereof each of which forms a gland for an O-ring 23. The upper end of the valve body is provided with a 20 degree chamber 24 at the step where the threads begin in order to aid in slipping the O-rings onto the valve body without damage thereto.

The upper end of the valve body is machined to include an O-ring gland 25 which receives O-ring 26 therein. The valve body is provided with a small axially aligned passage 27 that extends to a passage perpendicular to the axis across the diameter and located below the upper most O-ring gland half way between the upper most gland and the middle gland. A larger passage 31 extends axially from the bottom of the valve body upwardly to a passage 32 which extends perpendicular to the axis across the diameter thereof half way between the lowermost gland and the midddle gland.

A cap 33 of less diameter than the valve body is axially machined on one end 34 and threaded to match with the threaded upper end of the valve body. The bottom of the threaded end of the cap is provided with an O-ring gland 35 which includes an O-ring 36 that matches the O-ring 26 in the upper end of the valve body. The cap 33 is provided with an axial passage 39 from the threaded end upwardly to a passage 37 across the diameter perpendicular to the axis. The cap 33 threads onto the upper most end of the valve body and seals a thin metal sheet or disk 38 between O-rings 26 and 36 which includes an orifice 40 of a desired diameter therein. The orifice is so positioned that it is on the axis of the valve. Different disc with different sized orifices may be used for different rates of gas flow. The O-rings prevent any leakage between the cap and the upper end of the valve body.

The upper, inner end of the housing is provided with a filter 42 held in place by a spring type ring 42. The filter prevents any contaminants from entering the valve when in use. As shown, the valve is in its closed position.

The above described valve may be made of any desired materials depending on its use. A valve such as described herein has been described in a published article, "Atmospheric Sampling: Description of the Small Flow Control Valve Unit", by J. P. Stone, H. G. Eaton, and F. W. Williams, *Review of Scientific Instruments*, Vol. 46, No. 9, pp. 1288–1299, Sept. 1975, which is incorporated herein as a reference.

In describing the operation of the valve, the relative position of the O-ring glands on the valve body will become more clear. The valve is opened and closed by rotating the housing relative to the valve body or vice-versa. As shown, a clockwise rotation closes the valve at which position it is shown and a counterclock movement opens the valve.

Prior to assembly, a disk 38 with the desired orifice 40 must be selected and secured in place between the O-rings 26 and 36 in the cap and the upper end portion of the valve body. The O-rings 23 about the body are slipped over the valve body into their respective gland. The valve body is then inserted into the housing and rotated until the valve body stops rotating which is the closed position. The ends of the housing and valve body may be secured into a desired system such that either the housing or valve body or both may be rotated with respect to each other. Rotation of the valve body in a counter clockwise direction with respect to the housing will open the valve. The valve is opened by rotating the valve body with respect to the housing until the center groove or O-ring gland is opposite the opposing grooves 14 in the housing. The grooves in the housing are of such a depth that the O-ring does not provide a seal with the housing wall at that position. Therefore gases may flow by the center O-ring.

In the open position, gas will flow into the inlet end, through the filter, into the upper area of the valve. The upper O-ring prevents gas flow to the lower section; instead the gas gains admittance to the perpendicular passage in the cap and then flows axially through the cap 33, through the orifice "40", axially through the upper axial passage 27 in the valve body and out through the upper perpendicular passage in the valve body. Since the valve body has a loose fit with the housing, the gas will flow downwardly between the housing and valve body and between the central O-ring and the grooves 14 in the housing. The gas cannot flow upstream because of the upper O-ring and cannot flow between the housing and valve body below the lower gland because of a seal between the housing and the lower most O-ring. Therefore, the gas must flow through the lower perpendicular passage in the valve body to the axial passage and out through the outlet end. By such an arrangement of parts, a constant flow may be very accurately controlled. It is obvious that in the closed position, the central O-ring would prevent leakage to the passage 32. When in the open position, the upper O-ring prevents leakage at the inlet end and the bottom O-ring prevents leakage at the outlet end.

In use of such a valve, the filter in the inlet end filters any particulate matter from any fluid passing through the filter. The orifice size controls the flow of fluid. The O-rings should be made of a suitable material so they will not be attacked by the fluid being controlled. Further, the inside surface of the housing and the outside surface of the valve body must be smooth to prevent damage to the O-ring.

Obviously many modifications and variations of the present invention are possible in light of the above teachings. It is therefore to be understood that within the scope of the appended claims the invention may be practiced otherwise than as specfically described.

What is claimed and desired to be secured by Letters Patent of the United States is:

1. A stemless valve which comprises:

an elongated cylindrical housing with an axis along its length, said housing including an inlet end and an open end opposite said inlet end with each end coaxially aligned with said housing;

a cylindrical valve body extending into said open end of said housing with its linear axis in coaxial alignment with said housing, said valve body including an inner end toward said inlet end of said housing and an outer end extending from said open end of said housing;

an axially extending inlet passage in the inner end of said valve body in coaxial alignment with said housing and extending toward the outer end to a first passage across the diameter of said valve body perpendicular to the axis thereof;

an axially extending outlet passage in said valve body extending from the outer end of said valve body toward said inlet passage in coaxial alignment with said housing to a second passage across the diameter of said valve body perpendicular to the axis thereof with said first and second passages spaced from each other axially along said valve body and parallel with each other;

a first O-ring seal between said housing and said valve body on the inlet side of said first passage in said valve body and fixed within a first cylindrical cutout in said valve body;

a second O-ring seal between said valve body and said housing and located between said first and said second passages in said valve body within a second cylindrical cutout in said valve body to prevent fluid leakage;

a third O-ring seal between said valve body and said housing on the outlet side of said second passage in said valve body and fixed within a third cylindrical cutout in said valve body to prevent fluid leakage, said housing including opposing cutouts in the inner wall thereof in the area between said second and third O-ring seals within said valve body near said second passage in said valve body;

a threaded cap enclosing the upper end of said inner end of said valve body, said threaded cap including a passage therein coaxial with said housing and extending from said axially extending inlet passage in said valve body to a passage across the diameter thereof perpendicular to said coaxial passage therein with said coaxially aligned passage opening toward said inlet in said valve body; and a thin, interchangeable element secured in place between said threaded cap and the inner end of said valve body with said interchangeable element including an orifice therein coaxial with said housing with said orifice aligned with the axial passage in said cap and the inlet passage in the inner end of said valve body, said interchangeable element controlling fluid flow between said inlet in said housing through said passages in said cap to said inlet passage in said valve body, whereby said orifice in said interchangeable element and the position of said valve body in an axial position relative to said cutouts in said housing controls fluid flow through said stemless valve.

* * * * *